(12) United States Patent
Kumabe et al.

(10) Patent No.: US 10,732,299 B2
(45) Date of Patent: Aug. 4, 2020

(54) VELOCITY ESTIMATION DEVICE

(71) Applicant: DENSO CORPORATION, Kariya, Aichi-pref. (JP)

(72) Inventors: Seigou Kumabe, Kariya (JP); Kojiro Takeyama, Nagakute (JP); Yoshiko Kojima, Nagakute (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1044 days.

(21) Appl. No.: 15/110,048

(22) PCT Filed: Dec. 16, 2014

(86) PCT No.: PCT/JP2014/006245
§ 371 (c)(1),
(2) Date: Jul. 6, 2016

(87) PCT Pub. No.: WO2015/104757
PCT Pub. Date: Jul. 16, 2015

(65) Prior Publication Data
US 2016/0327654 A1   Nov. 10, 2016

(30) Foreign Application Priority Data

Jan. 8, 2014   (JP) .................. 2014-002002

(51) Int. Cl.
*G01S 19/52*   (2010.01)
*G01S 19/49*   (2010.01)

(52) U.S. Cl.
CPC .............. *G01S 19/52* (2013.01); *G01S 19/49* (2013.01)

(58) Field of Classification Search
CPC ................................ G01S 19/49; G01S 19/52
See application file for complete search history.

(56) References Cited

U.S. PATENT DOCUMENTS

| 2007/0005212 A1* | 1/2007 | Xu ...................... B60R 21/0132 |
| | | 701/70 |
| 2010/0048140 A1 | 2/2010 | Tajima et al. |
| 2011/0235686 A1 | 9/2011 | Kojima et al. |

FOREIGN PATENT DOCUMENTS

| JP | H09196691 A | 7/1997 |
| JP | 2008128793 A | 6/2008 |
| JP | 2010002258 A | 1/2010 |
| JP | 2011209268 A | 10/2011 |
| JP | 2012042318 A | 3/2012 |
| JP | 2013113789 A | 6/2013 |

* cited by examiner

*Primary Examiner* — Bryan Bui
(74) *Attorney, Agent, or Firm* — Harness, Dickey & Pierce, P.L.C.

(57) ABSTRACT

A velocity estimation device including an acceleration sensor and a yaw rate sensor is provided. The velocity estimation device determines an initial velocity value of a mobile object based on a velocity estimation expression, an integrated value of acceleration detected by the acceleration sensor, and a relative azimuth calculated from detected yaw rates. The velocity estimation device estimates the velocity of the mobile object based on the initial velocity value and the integrated value of acceleration. In the velocity estimation expression, a magnitude of the velocity vector is constrained by the velocity of the mobile object and a time variation of a direction of the velocity vector is constrained by a time variation of the azimuth of the mobile object in the traveling direction.

2 Claims, 5 Drawing Sheets

VELOCITY ESTIMATION DEVICE

CROSS-REFERENCE TO RELATED APPLICATIONS

This application is a U.S. National Phase Application under 35 U.S.C. 371 of International Application No. PCT/JP2014/006245 filed on Dec. 16, 2014 and published in Japanese as WO 2015/104757 A1 on Jul. 16, 2015. This application is based on and claims the benefit of priority from Japanese Patent Application No. 2014-002002 filed on Jan. 8, 2014. The entire disclosures of all of the above applications are incorporated herein by reference.

TECHNICAL FIELD

The present disclosure relates to a velocity estimation device, in particular to a technology of improving velocity estimation accuracy.

BACKGROUND ART

Various technologies of estimating a velocity of a mobile object are known. For example, Patent Literature 1 discloses the technology of measuring an acceleration and calculating a velocity from the acceleration and additionally calculating a velocity (hereunder referred to as a Doppler velocity) from a Doppler shift amount of a GPS carrier wave. In Patent Literature 1, a velocity calculated from acceleration is corrected by a Doppler velocity.

A velocity calculated from acceleration can be renewed in a short cycle but is more likely to cause error than a Doppler velocity. For the reason, a velocity calculated from an acceleration is corrected by a Doppler velocity. Further, the quality of a Doppler velocity is also determined and the extent of correcting a velocity calculated from an acceleration is adjusted by the Doppler velocity on the basis of the result of the quality determination.

Patent Literature 2 discloses a technology of estimating a velocity vector of a vehicle with a high degree of accuracy. Concretely, the technology of Patent Literature 2 uses an expression showing a relationship among a satellite direction vehicle velocity, a tire wheel velocity, a line-of-sight vector from a vehicle to a satellite in a positioning system, a vehicle orientation, and a clock drift for estimating a velocity vector. The expression is obtained by deforming an expression showing a relationship among a satellite direction velocity, a line-of-sight vector, a velocity vector, and a clock drift with constraint conditions. The constraint conditions comprise the condition that a velocity vector is constrained by a velocity and a yaw rate of a mobile object and the condition that the time variation of a clock drift is linear.

PRIOR ART LITERATURE

Patent Literature

Patent Literature 1: JP 2012-42318A
Patent Literature 2: JP 2013-113789A

SUMMARY OF INVENTION

The technology of Patent Literature 2 requires a tire wheel velocity. As a result, the problem of the technology of Patent Literature 2 has been that the technology cannot be applied to a velocity estimation device that cannot be connected to a tire wheel velocity sensor.

In the technology of Patent Literature 1 in contrast, a device is not required to be connected to a tire wheel velocity sensor because a velocity is calculated from an acceleration detected by an acceleration sensor installed in the device itself.

Since a sensor has a phenomenon called drift as it is widely known, the error of a value detected by a sensor diverges with the lapse of time. Consequently, in the technology of Patent Literature 1, a velocity calculated from an acceleration is corrected by a Doppler velocity. Further, since the accuracy of a Doppler velocity drops by the influence of a multipath and the like in some cases, the quality of a Doppler velocity is determined in Patent Literature 1. Then the extent of correction is adjusted by a coefficient corresponding to the quality.

Since a value detected by an acceleration sensor is used for the quality determination of a Doppler velocity however, it cannot be said that the accuracy of the determination is sufficiently good. Further, when GPS radio waves having good signal qualities cannot be received from a plurality of satellites, the accuracy of a Doppler velocity drops. As a result, it cannot be said that the accuracy of a velocity calculated from an acceleration is sufficiently high even when it is corrected by a coefficient corresponding to the quality.

The present disclosure is made in view of the above circumstances and has an object to provide a velocity estimation device capable of estimating a velocity with a high degree of accuracy.

A velocity estimation device in a first example of the present disclosure comprises: an acceleration sensor that moves together with a mobile object; a yaw rate sensor that detects a yaw rate of the mobile object; a traveling direction acceleration determination unit that sequentially determines a traveling direction acceleration, the traveling direction acceleration being a traveling direction component of a value detected by the acceleration sensor; an integration processing unit that sequentially calculates an acceleration integrated value through integrating the traveling direction accelerations determined by the traveling direction acceleration determination unit and sequentially calculates a relative azimuth to the traveling direction at a base point of time through integrating yaw rates detected by the yaw rate sensor; a satellite signal acquisition unit that acquires a satellite signal from a satellite included in a satellite positioning system; a satellite direction velocity calculation unit that calculates a satellite direction velocity on a basis of the satellite signal, the satellite direction velocity being a component of a velocity of the mobile object in a direction to the satellite; a line-of-sight vector calculation unit that calculates a line-of-sight vector from the mobile object to the satellite on a basis of the satellite signal; an initial setting value determination unit that determines an initial velocity value of the mobile object on a basis of (i) a velocity estimation expression showing a relationship among the satellite direction velocity, the line-of-sight vector, the velocity of the mobile object, and a traveling orientation of the mobile object, (ii) the satellite direction velocity calculated by the satellite direction velocity calculation unit, (iii) the line-of-sight vector calculated by the line-of-sight vector calculation unit, and (iv) the relative azimuth calculated by the integration processing unit; and an estimated velocity determination unit that estimates the velocity of the mobile object on a basis of the acceleration integrated value calculated by the integration processing unit and the initial velocity value determined by the initial setting value determination unit. In an expression showing the relationship among the satellite direction velocity, the line-of-sight vector, and a velocity vector of the mobile object in the velocity estimation expression, a magnitude of the velocity vector is constrained by the velocity of the mobile object and a time variation of the direction of the velocity vector is constrained by a time variation of the azimuth of the mobile object in the traveling direction.

The satellite direction velocity of the mobile object can be calculated on the basis of the line-of-sight vector from the mobile object to the satellite and the velocity vector of the mobile object. That is, the expression showing the relationship among the satellite direction velocity, the line-of-sight vector, and the velocity vector of the mobile object can be formed. In the present invention, the initial velocity value is determined, in the expression, by using the velocity estimation expression in which the velocity vector is constrained by the velocity of the mobile object and the time variation of the azimuth of the mobile object in the traveling direction.

The velocity estimation expression is constrained by the time variation of the azimuth of the mobile object in the traveling direction and hence the velocity estimation expression using satellite signals at a plurality of different observation points can comprise simultaneous equations. Therefore, even when a plurality of unknown parameters including a velocity of a mobile object exist in a velocity estimation expression, simultaneous equations comprising velocity equation expressions of the number allowing the unknown parameters to be solved can be easily formed. As a result, a velocity of a mobile object can be easily obtained from the velocity estimation expressions and hence the initial setting value determination unit can obtain an initial velocity value with a high frequency. Then by renewing the initial velocity value with a high frequency, it is possible to increase the frequency of removing the influence of drift from a value detected by an acceleration sensor and hence the estimation accuracy of a velocity estimated from an acceleration integrated value and an initial velocity value improves.

A velocity estimation device in an second example of the present disclosure comprises: an acceleration sensor that moves together with a mobile object; a traveling direction acceleration determination unit that sequentially determines a traveling direction acceleration, the traveling direction acceleration being a traveling direction component of a value detected by the acceleration sensor; an integration processing unit that sequentially calculates an acceleration integrated value through integrating the traveling direction accelerations determined by the traveling direction acceleration determination unit; a satellite signal acquisition unit that acquires a satellite signal from a satellite included in a satellite positioning system; a satellite direction velocity calculation unit that calculates a satellite direction velocity on a basis of the satellite signal, the satellite direction velocity being a component of a velocity of the mobile object in a direction to the satellite; a line-of-sight vector calculation unit that calculates a line-of-sight vector from the mobile object to the satellite on a basis of the satellite signal; an initial setting value determination unit that determines an initial velocity value of the mobile object on a basis of (i) a velocity estimation expression showing a relationship among the satellite direction velocity, the line-of-sight vector, the velocity of the mobile object, a traveling orientation of the mobile object, and a clock drift, (ii) the satellite direction velocity calculated by the satellite direction velocity calculation unit, and (iii) the line-of-sight vector calculated by the line-of-sight vector calculation unit; and an estimated velocity determination unit that estimates the velocity of the mobile object on a basis of the acceleration integrated value calculated by the integration processing unit and the initial velocity value determined by the initial setting value determination unit. In an expression showing the relationship among the satellite direction velocity, the line-of-sight vector, a velocity vector of the mobile object, and the clock drift in the velocity estimation expression, a magnitude of the velocity vector is constrained by the velocity of the mobile object and the clock drift is constrained by a constraint condition that a time variation of the clock drift is linear.

As described also in Patent Literature 2, an expression showing a relationship among a satellite direction velocity, a line-of-sight vector, the velocity vector of a mobile object, and a clock drift can be formed. In the present invention, an initial velocity value is determined, in the expression, by using a velocity estimation expression in which a magnitude of a velocity vector is constrained by a velocity of a mobile object and a clock drift is constrained by the constraint condition that the time variation of the clock drift is linear.

The velocity estimation expression is constrained by the condition related to the time variation of a clock drift and hence the velocity estimation expression using satellite signals at a plurality of different observation points can comprise simultaneous equations. Therefore, even when a plurality of unknown parameters including a velocity of a mobile object exist in a velocity estimation expression, simultaneous equations comprising velocity estimation expressions of the number allowing the unknown parameters to be solved can be easily formed. As a result, the velocity of a mobile object can be easily obtained from the velocity estimation expressions and hence the initial setting value determination unit can obtain an initial velocity value with a high frequency. Then by renewing the initial velocity value with a high frequency, it is possible to increase the frequency of removing the influence of drift from a value detected by an acceleration sensor and hence the estimation accuracy of a velocity estimated from an acceleration integrated value and an initial velocity value improves.

DESCRIPTION OF EMBODIMENTS

Configuration of Embodiment

Figure 1:
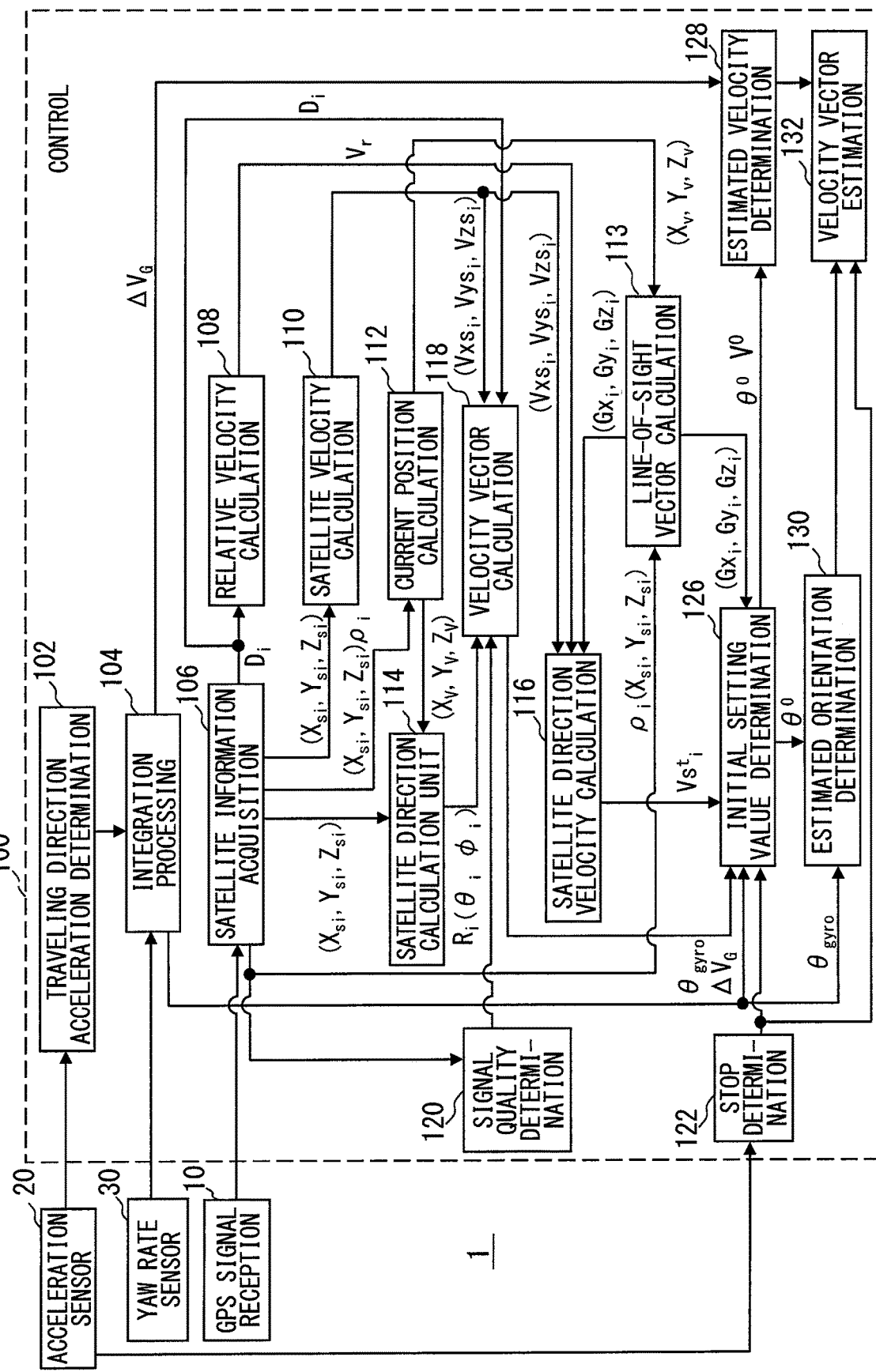
FIG. 1 is a configuration diagram of a velocity estimation device according to an embodiment.

An embodiment of the present disclosure is explained hereunder in reference to drawings. As shown in FIG. 1, a velocity estimation device 1 according to the present embodiment has a GPS signal reception unit 10, an acceleration sensor 20, a yaw rate sensor 30, and a control unit 100. The velocity estimation device 1 is fixed to a vehicle not shown in the figure in a predetermined orientation.

The GPS signal reception unit 10 is a receiver to receive GPS radio waves transmitted by a GPS satellite included in a global positioning system (hereunder, GPS) that is one of satellite positioning systems. The GPS radio waves mean waves formed by superimposing a GPS signal over carrier waves. The GPS signal reception unit 10 extracts a GPS signal by demodulating received GPS radio waves and sends it to the control unit 100. Further, carrier waves and a received signal strength are also sent to the control unit 100. The GPS signal reception unit 10 corresponds to a signal reception unit in CLAIMS and the GPS signal corresponds to a satellite signal in CLAIMS.

As widely known, a plurality of GPS satellites exist. The GPS signal reception unit 10 receives all of the GPS radio waves receivable from GPS satellites. In a GPS signal, the satellite number of a GPS satellite, an ephemeris that is trajectory information of the GPS satellite, the time when the GPS satellite transmits radio waves, and the like are included.

The acceleration sensor 20 is a triaxial acceleration sensor and the orientation of the acceleration sensor 20 is fixed so that the z axis may be parallel with the vertical direction of a vehicle, the x axis may be parallel with the width direction of the vehicle, and the y axis may be parallel with the anteroposterior direction of the vehicle. Here, an acceleration sensor to detect the accelerations along two axes of the x axis and the y axis may be used instead of the triaxial acceleration sensor. The acceleration sensor 20 sends the detected values of accelerations along the respective axes to the control unit 100.

The yaw rate sensor 30 detects a rotational angular velocity around the vertical axis of the vehicle passing through the yaw rate sensor 30, namely a yaw rate. Then the detected yaw rate is supplied to the control unit 100. Here, the vertical axis of a vehicle is an axis vertical to a vehicle interior floor. The vertical axis is parallel to the gravity direction when the vehicle is located on a horizontal ground.

The control unit 100: is a computer equipped with a CPU, a ROM, a RAM, and others; and functions as the respective units 102 to 132 shown in FIG. 1 by having the CPU carry out a program stored in the ROM while the temporary memory function of the RAM is used.

A traveling direction acceleration determination unit 102 determines a traveling direction acceleration of a vehicle from a value detected by the acceleration sensor 20. As stated earlier, the acceleration sensor 20 is fixed to a vehicle in the predetermined orientation and the y axis is directed to the vehicle traveling direction. As a result, the y axis value detected by the acceleration sensor 20 is extracted as the traveling direction acceleration.

An integration processing unit 104 sequentially integrates traveling direction accelerations determined by the traveling direction acceleration determination unit 102, namely the y axis values detected by the acceleration sensor 20. The integrated value is hereunder called an acceleration integrated value $\Delta V_G$. Further, the integration processing unit 104 integrates values detected by the yaw rate sensor 30 and calculates a relative azimuth $\theta^t_{gyro}$. The relative azimuth $\theta^t_{gyro}$ is a relative azimuth at time t to the traveling orientation of a vehicle at a base point of time. The relative azimuth $\theta^t_{gyro}$ is calculated from the expression (1). In the expression (1), $\Delta t$ is a time step and $\omega^t$ is a value detected by the yaw rate sensor 30 at the time t.

[Mathematical expression 1]

$$\theta^t_{gyro} = \Delta t \sum_{t'=0}^{t} \omega^{t'} \quad (1)$$

Here, the value detected by the acceleration sensor 20 and the value detected by the yaw rate sensor 30 for calculating the acceleration integrated value $\Delta V_G$ and the relative azimuth $\theta^t_{gyro}$ respectively are acquired at the same timing. The timing of the acquisition is at a certain period of time or at the time of traveling a certain distance, for example.

A satellite information acquisition unit 106 acquires a GPS signal and a carrier wave from the GPS signal reception unit 10. When the GPS signal reception unit 10 receives GPS radio waves from a plurality of GPS satellites, the satellite information acquisition unit 106 acquires the GPS signals and carrier waves on all of the GPS satellites from which the GPS signal reception unit 10 receives the GPS radio waves. The satellite information acquisition unit 106 functions as a satellite signal acquisition unit in CLAIMS.

Further, the satellite information acquisition unit 106 also calculates a positional coordinate $(X_{si}, Y_{si}, Z_{si})$, a pseudo range $\rho_i$, and a Doppler shift amount $D_i$ of a GPS satellite i, those being information on the GPS satellite i obtained from the GPS signals and the carrier waves.

A positional coordinate $(X_{si}, Y_{si}, Z_{si})$ of a GPS satellite i is calculated on the basis of the ephemeris of the GPS satellite i and the time when a radio wave is transmitted. A pseudo range $\rho_i$ is calculated by multiplying the velocity of light by the time difference between the time when a GPS satellite i transmits a GPS radio wave and the time when the GPS signal reception unit 10 receives the GPS radio wave, namely the radio wave propagation time.

The Doppler shift amount $D_i$ is a frequency difference between the frequency of a carrier wave of a radio wave transmitted by a GPS satellite i and the frequency of a carrier wave of a received GPS radio wave. The carrier wave frequency of a radio wave transmitted from a GPS satellite is predetermined and the frequency is stored beforehand in a predetermined memory unit such as a memory unit, not shown in the figure, included in the control unit 100. The satellite information acquisition unit 106 therefore acquires the frequency of a carrier wave of a GPS radio wave from the memory unit and calculates a Doppler shift amount $D_i$ from the frequency and the frequency of a carrier wave acquired from the GPS signal reception unit 10. Here, the frequency of a carrier wave acquired by the satellite information acquisition unit 106 is determined by a known frequency analysis method, for example by fast Fourier transformation.

A relative velocity calculation unit 108 calculates a relative velocity $Vr_i$ of a vehicle to a GPS satellite i on the basis of a Doppler shift amount $D_i$ calculated by the satellite information acquisition unit 106. The relative velocity $Vr_i$ is calculated from the following expression (2). In the expression (2), $Vr_i$ is a relative velocity of a vehicle to a GPS satellite i, $D_i$ is a Doppler shift amount calculated by the satellite information acquisition unit 106, C is the velocity of light, and F is a frequency of a carrier wave of a radio wave transmitted from a GPS satellite.

[Mathematical expression 2]

$$Vr_i = -D_i \cdot C/F \quad (2)$$

A satellite velocity calculation unit 110 calculates a velocity vector, namely a three-dimensional velocity $Vxs_i$, $Vys_i$, and $Vzs_i$, of a GPS satellite i from time-series data of a positional coordinate $(X_{si}, Y_{si}, Z_{si})$ of the GPS satellite i calculated by the satellite information acquisition unit 106 by a known method of using differential of the Kepler's equation.

A current position calculation unit 112 calculates a current position $(X_v, Y_v, Z_v)$ of a vehicle by using a pseudo range $\rho_i$ of a GPS satellite i calculated by the satellite information acquisition unit 106.

In the event of positioning using a GPS signal, a current position $(X_v, Y_v, Z_v)$ of a vehicle is calculated on the basis of a positional coordinate $(X_{si}, Y_{si}, Z_{si})$ of a GPS satellite i and a pseudo range $\rho_i$ from the GPS satellite in accordance with the principle of triangulation. Here, a true distance $r_i$ to a GPS satellite i is represented by the expression (3). Meanwhile, the pseudo range $\rho_i$ is represented by the expression (4). In the expression (4) here, s is a distance error caused by time error.

[Mathematical expression 3]

$$r_i = \sqrt{(X_{si}-X_v)^2+(Y_{si}-Y_v)^2+(Z_{si}-Z_v)^2} \quad (3)$$

$$\rho_i = r_i + s \quad (4)$$

From the expressions (3) and (4), a current position $(X_v, Y_v, Z_v)$ of a vehicle can be calculated by solving the following simultaneous equations (5) obtained from pseudo ranges $\rho_i$ of four or more GPS satellites.

[Mathematical expression 4]

$$\begin{cases} \rho_1 = \sqrt{(X_{s1}-X_v)^2+(Y_{s1}-Y_v)^2+(Z_{s1}-Z_v)^2} + s \\ \rho_2 = \sqrt{(X_{s2}-X_v)^2+(Y_{s2}-Y_v)^2+(Z_{s2}-Z_v)^2} + s \\ \vdots \\ \rho_N = \sqrt{(X_{sN}-X_v)^2+(Y_{sN}-Yv)^2+(Z_{sN}-Z_v)^2} + s \end{cases} \quad (5)$$

Here, in the present embodiment, a current position $(X_v, Y_v, Z_v)$ of a vehicle is calculated in order to obtain the direction of a GPS satellite i, namely an angle between the GPS satellite and the vehicle in a satellite direction calculation unit 114 that will be described later.

Since a GPS satellite is in the distance, the accuracy of a current position $(X_v, Y_v, Z_v)$ of a vehicle here may be low. Consequently, a current position $(X_v, Y_v, Z_v)$ of a vehicle may be determined by a low accuracy method other than the method of determining a position by using a pseudo ranges $\rho_i$. Although it depends on estimation accuracy allowed in a system or the like, as long as the positional error of a vehicle is within the range of several hundred meters, the velocity estimation error is not more than 1 m/sec and the error is not a major problem. As a result, for example, a position may be determined from a map or the like or a current position $(X_v, Y_v, Z_v)$ of a vehicle may be determined from past measurement history of a position or information of a beacon or the like.

A line-of-sight vector calculation unit 113 calculates a line-of-sight vector $(Gx_i, Gy_i, Gz_i)$ from a vehicle to a GPS satellite i. The x component, y component, and z component of a line-of-sight vector are calculated from the expression (6).

[Mathematical expression 5]

$$Gx_i^t = \frac{1}{\rho_i^t}(X_{si}^t - X_v^t),$$

$$Gy_i^t = \frac{1}{\rho_i^t}(Y_{si}^t - Y_v^t),$$

$$Gz_i^t = \frac{1}{\rho_i^t}(Z_{si}^t - Z_v^t) \quad (6)$$

In the expression (6), $\rho_i^t$ is a pseudo range of a GPS satellite i at time t and $(X_{si}^t, Y_{si}^t, Z_{si}^t)$ is a positional coordinate of the GPS satellite i at time t. Those are calculated by the satellite information acquisition unit 106. $(X_v^t, Y_v^t, Z_v^t)$ is a current position at time t and is calculated by the current position calculation unit 112.

The satellite direction calculation unit 114 calculates a direction $R_i$ of a GPS satellite i on the basis of a current position $(X_v, Y_v, Z_v)$ calculated by the current position calculation unit 112 and a positional coordinate $(X_{si}, Y_{si}, Z_{si})$ of the GPS satellite calculated by the satellite information acquisition unit 106. The direction $R_i$ of the GPS satellite i is represented with an elevation $\theta_i$ relative to the horizontal direction and an azimuth relative to the north direction when the GPS satellite i is viewed from a vehicle.

A satellite direction velocity calculation unit 116 calculates a satellite direction velocity $Vs_i$ that is the velocity in the direction from a vehicle to a GPS satellite i. The satellite direction velocity $Vs_i$ is calculated from the following expression (7).

[Mathematical expression 6]

$$Vs_i^t = \frac{D_i^t}{f}C + Gx_i^t Vxs_i^t + Gy_i^t Vys_i^t + Gz_i^t Vzs_i^t \quad (7)$$

In the expression (7), the first term on the right side is a relative velocity Vr and is calculated by the relative velocity calculation unit 108. Gx, Gy, and Gz represent a line-of-sight vector and are calculated by the line-of-sight vector calculation unit 113. Vxs, Vys, and Vzs are the x, y, and z components of a velocity of a GPS satellite i and are calculated by the satellite velocity calculation unit 110. The first term on the right side in the expression (7) is a relative velocity $Vr_i$ of a vehicle to a GPS satellite i and the second to fourth terms represent a velocity of the GPS satellite i in the direction to the vehicle. The sum of them means the velocity of the vehicle in the direction to the GPS satellite i and hence the expression (7) can be formed.

A velocity vector calculation unit 118 calculates a velocity vector of a vehicle. When a velocity vector of a vehicle is represented by (Vx, Vy, Vz), the relationship between a satellite direction velocity $Vs_i$ and a velocity vector (Vx, Vy, Vz) of the vehicle is represented by the following expression (8).

[Mathematical expression 7]

$$-Vx \cdot \cos\theta_i \cdot \sin\phi_i + Vy \cdot \cos\theta_i \cdot \cos\phi_i + Vz \cdot \sin\theta_i = Vs_i$$

$$Vr_i = -D_i \cdot C/F = V\text{sat}_i - Vs_i + vCb$$

$$Vs_i - vCb = V\text{sat}_i + D_i \cdot C/F \quad (8)$$

From the expression (8) obtained with respect to a GPS satellite i, simultaneous equations represented by the following expression (9) including a velocity vector (Vx, Vy, Vz) of a vehicle and Cbv as unknown quantities are obtained.

In the expression (9), $Vsat_i$ is a velocity of a GPS satellite i in the direction to a vehicle and is obtained from $Vsat_i=R_i \cdot [Vxs_i, Vys_i, Vzs_i]^T$. T means transposition of a matrix. Here, the velocity $Vsat_i$ of a GPS satellite i in the direction to a vehicle may also be obtained by calculating the second to fourth terms on the right side in the expression (7). Cbv is a clock drift of a clock included in the GPS signal reception unit 10.

[Mathematical expression 8]

$$\begin{pmatrix} Vsat_0 + D_0 \cdot C/F \\ Vsat_1 + D_1 \cdot C/F \\ \vdots \\ Vsat_N + D_N \cdot C/F \end{pmatrix} = \begin{pmatrix} -\cos\theta_0 \sin\phi_0 & \cos\theta_0 \cos\phi_0 & \sin\theta_0 & -1 \\ -\cos\theta_1 \sin\phi_1 & \cos\theta_1 \cos\phi_1 & \sin\theta_1 & -1 \\ \vdots & \vdots & \vdots & \vdots \\ -\cos\theta_N \sin\phi_N & \cos\theta_N \cos\phi_N & \sin\theta_N & -1 \end{pmatrix} \cdot \begin{pmatrix} Vx \\ Vy \\ Vz \\ Cbv \end{pmatrix} \quad (9)$$

The simultaneous equations represented by the expression (9) can be solved when the number of GPS satellites from which the GPS radio waves are received is four or more. Here, even when a GPS radio wave is received, the GPS radio wave that cannot be determined as a good signal quality is excluded. The velocity vector calculation unit 118 therefore calculates a velocity vector of a vehicle from the expression (9) when GPS radio waves that have been determined as good signal qualities are received from four or more GPS satellites. Whether or not a signal quality is good is determined by a signal quality determination unit 120 that will be explained below.

Since the expression (9) is an expression including Doppler shift amounts D, the velocity vector calculation unit 118 calculates a velocity vector (Vx, Vy, Vz) of a vehicle on the basis of the Doppler shift amounts. The velocity vector calculation unit 118 therefore corresponds to a Doppler velocity calculation unit in CLAIMS.

The signal quality determination unit 120 determines whether or not the signal quality of a GPS radio wave from a GPS satellite i received by the GPS signal reception unit 10 is good. Various known criteria can be used for the determination of a signal quality.

For example, whether or not a signal quality is good is determined by the condition that S/N is not lower than a predetermined value (determination condition 1), the condition that a residual error of a pseudo range $\rho_i$ is not higher than a determination standard distance (determination condition 2), the condition that an elevation $\theta_i$ is not less than a determination standard angle (determination condition 3), or a combination of the determination conditions 1 to 3 (determination condition 4).

Here, the residual error of a pseudo range $\rho_i$ is the difference between the distance between a positional coordinate $(X_{si}, Y_{si}, Z_{si})$ of a GPS satellite i and a current position $(X_v, Y_v, Z_v)$ of a vehicle and the pseudo range $\rho_i$. When the residual error is large, the influence of a multipath or the like is conceivable and hence the signal quality is determined as poor. Here, in the case of the determination condition 1, the signal quality is determined as good if S/N is not lower than a predetermined value. In the case of the determination condition 3, the signal quality is determined as good if an elevation $\theta_i$ is not less than a determination standard angle.

A stop determination unit 122 determines whether or not a vehicle stops. As the method of stop determination, various kinds of known methods can be used. For example, a vehicle is determined to stop if a value on the z axis detected by the acceleration sensor 20 is not more than a stop determination value. When a vehicle travels, there are some vertical vibrations and thus stop determination can be done by a detected z axis value. In place of a detected z axis value, a detected y axis value, the variation of a detected z axis value, or the variation of a detected y axis value may be used. When stop determination is carried out by a value detected by the acceleration sensor 20, wiring for acquiring a brake signal or a shift position signal is advantageously unnecessary. Obviously, it is also possible to make a brake signal or a shift position signal acquired and carry out stop determination by using such a signal.

An initial setting value determination unit 126 determines an initial velocity value $V^0$ used in an estimated velocity determination unit 128 and an orientation initial value $\theta^0$ used in an estimated orientation determination unit 130.

In the present embodiment, it is possible to calculate a velocity of a vehicle also at the already-explained velocity vector calculation unit 118. The velocity vector calculation unit 118 however cannot calculate a velocity vector (Vx, Vy, Vz) of a vehicle unless GPS radio waves having good signal qualities are received from four or more GPS satellites. Further, even in an environment allowing receipt of four or more GPS radio waves having good signal qualities, the velocity vector calculation unit 118 can calculate a velocity vector (Vx, Vy, Vz) of a vehicle only at every constant period of 100 ms for example because the velocity vector calculation unit 118 uses a Doppler shift amount D requiring frequency analysis.

In contrast, a value detected by the acceleration sensor 20 can be obtained at every period of 20 ms for example shorter than the period at which the velocity vector calculation unit 118 can calculate a velocity vector (Vx, Vy, Vz). Thus during the time when the velocity vector calculation unit 118 calculates a velocity vector (Vx, Vy, Vz) of a vehicle and then calculates another velocity vector (Vx, Vy, Vz) of the vehicle, velocity estimation is carried out on the basis of an acceleration integrated value $\Delta V_G$.

Figure 2:
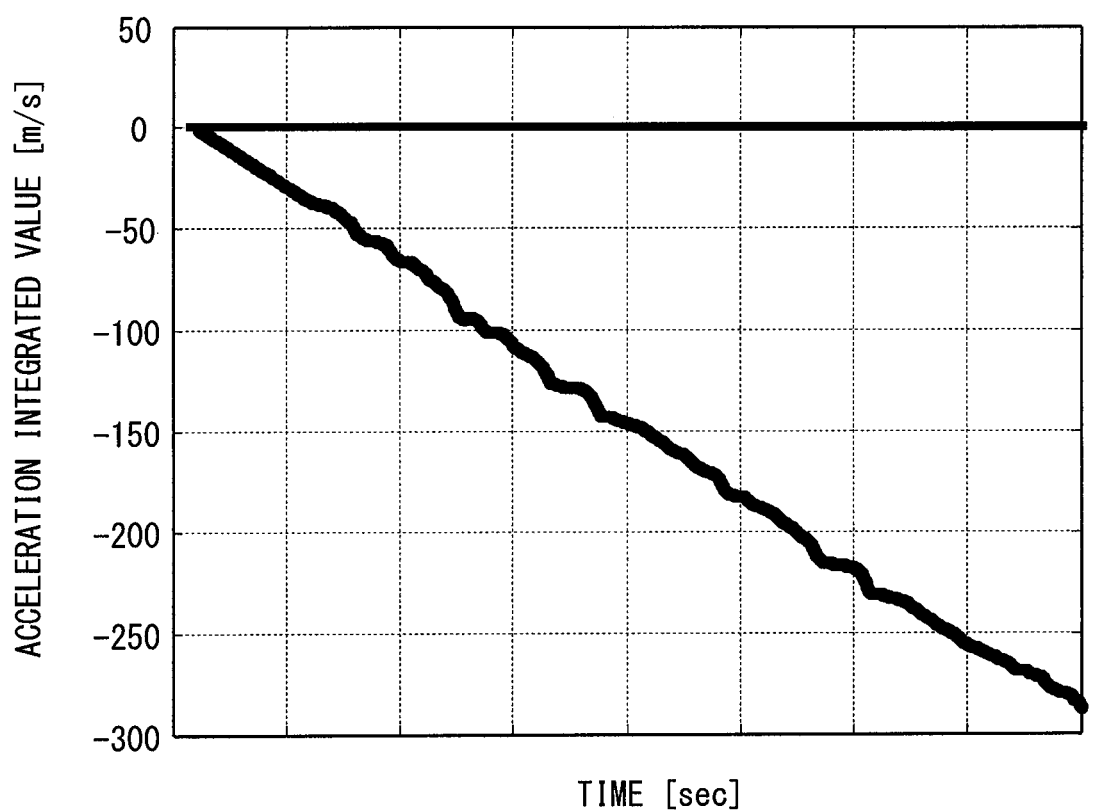
FIG. 2 is a view showing that an error of an acceleration integrated value $\Delta V_G$ diverges.

A value detected by the acceleration sensor 20 always has an error however and the error diverges in nature. FIG. 2 is a graph showing the nature. FIG. 2 is a graph of an acceleration integrated value $\Delta V_G$ in a stopped state. Because a vehicle is in a stopped state, the acceleration integrated value $\Delta V_G$ in FIG. 2 means an error when the acceleration integrated value $\Delta V_G$ is directly used as a velocity. From FIG. 2, it is obvious that the error diverges with the lapse of time when the acceleration integrated value $\Delta V_G$ is directly used as a velocity. Here, although the error takes negative values in FIG. 2, the error may inversely take positive values in some cases.

In this way, when an acceleration integrated value $\Delta V_G$ is directly used as a velocity, the error diverges with the lapse of time. In the present embodiment therefore, at a time when a highly-accurate velocity is obtained, the highly-accurate velocity is used as an initial velocity value $V^0$.

A value obtained by subtracting $\Delta V_G$ obtained at that time from the highly-accurate velocity is regarded as an initial velocity value $V^0$. The initial velocity value $V^0$ obtained in this way means an offset fraction for obtaining a highly-accurate velocity, which is regarded as a true velocity, from the acceleration integrated value $\Delta V_G$. An estimated velocity Ve therefore is obtained from $\Delta V_G - V^0$.

An error between an acceleration integrated value $\Delta V_G$ and a true velocity increases with the lapse of time. Consequently, as the renewal cycle of an initial velocity value $V^0$ decreases, the estimated accuracy of a velocity using the acceleration integrated value $\Delta V_G$ improves.

In the present embodiment therefore, an initial velocity value $V^0$ is calculated from the expression (12) formed by improving the following expression (11) disclosed as a final velocity vector calculation formula in Patent Literature 2. Further, an orientation initial value $\theta^0$ is calculated at the same time. The reason is that the expression (12) can renew an initial velocity value $V^0$.

Meanwhile, with regard to an initial velocity value $V^0$, the initial velocity value $V^0$ is determined from the expression (10) when the velocity vector calculation unit 118 can calculate a velocity vector (Vx, Vy, Vz). The reason is that the velocity vector (Vx, Vy, Vz) calculated by the velocity vector calculation unit 118 is highly accurate and hence the accuracy of an initial velocity value $V^0$ rather improves when the initial velocity value $V^0$ is determined by using the velocity vector (Vx, Vy, Vz). Further, when the stop determination unit 122 determines that a vehicle stops, the initial velocity value $V^0$ is set at $-\Delta V_G$.

[Mathematical expression 9]

$$V^0 = \sqrt{Vx^2 + Vy^2 + Vz^2} - \Delta V_G \quad (10)$$

$$Vs^t_i = V^t_{wheel} Gx^t_i \cos(\theta^0 + \theta^t_{gyro}) + V^t_{wheel} Gy^t_i \sin(\theta^0 + \theta^t_{gyro}) - Cbv^0 - At \quad (11)$$

$$Vs^t_i = (V^0 + \Delta V^t_G) Gx^t_i \cos(\theta^0 + \Delta^t_{gyro}) + (V^0 + \Delta V^t_G) Gy^t_i \sin(\theta^0 + \theta^t_{gyro}) - Cbv^0 - At \quad (12)$$

In the expression (11), t is time, $V_{wheel}$ is a value detected by a tire wheel velocity sensor, $\theta^0$ is an azimuth of a vehicle in the traveling direction at initial time (hereunder an orientation initial value), $\theta_{gyro}$ is an integrated value of azimuths of a vehicle in the traveling direction, namely a relative azimuth, $Cbv^0$ is a clock drift at initial time, A is a gradient of the time variation of a clock drift, and Gx and Gy are the x component and the y component of a line-of-sight vector from a vehicle to a GPS satellite i.

Further, in the expression (12), $V^0$ is an initial velocity value that is a vehicle velocity at initial time and $\Delta V_G$ is an acceleration integrated value after the initial time. That is, the expression (12) is an expression obtained by replacing a value $V_{wheel}$ detected by a tire wheel velocity sensor in the expression (11) with the sum of an initial velocity value $V^0$ and an acceleration integrated value $\Delta V_G$. The expression (12) corresponds to a velocity estimation expression in CLAIMS.

Firstly, a method of deriving the expression (11) is explained. As disclosed also in Patent Literature 2, the relationship between a satellite direction velocity $Vs^t_1$ and a velocity vector (Vx, Vy, Vz) of a vehicle can be represented by the expression (13).

[Mathematical expression 10]

$$Vs^t_i = Gx^t_i Vx^t + Gy^t_i Vy^t + Gz^t_i Vz^t - Cbv^t \quad (13)$$

In the expression (13), there are four unknown parameters of $Vx^t$, $Vy^t$, $Vz^t$, and $Cbv^t$. The expression (11) is derived by substituting the constraint conditions 1 to 3, those being described below, into the expression (13) in Patent Literature 2 in order to reduce the number of the unknown parameters.

[Mathematical expression 11]

$$\begin{cases} Vx^t = V^t_{wheel} \cos\left(\theta^0 + \theta^t_{gyro}\right) \\ Vy^t = V^t_{wheel} \sin\left(\theta^0 + \theta^t_{gyro}\right) \end{cases} \quad \text{Constraint condition 1}$$

$$Vz^t = 0 \quad \text{Constraint condition 2}$$

$$Cbv^t = Cbv^0 + At \quad \text{Constraint condition 3}$$

The constraint condition 1 represents that the magnitudes of the x component and the y component of an estimated velocity vector are constrained by a tire wheel velocity and further the time variation fractions of the x component and the y component are constrained by the time variation of an azimuth. $\theta^0$ in the constraint condition 1 is an azimuth of a vehicle in the traveling direction at initial time. The constraint condition 2 represents that the variation of a velocity in the vertical direction is assumed to be always trifle.

The constraint condition 3 represents that the variation of a clock drift in a short period of time is assumed to be linear because the time variation of the clock drift is mild. $Cbv^0$ in the constraint condition 3 shows a clock drift at initial time and A shows a gradient of the time variation of the clock drift.

Here, although only the velocity components in a two-dimensional plane are constrained by time variation in the constraint conditions 1 and 2, it is also possible to constrain the z axis component by time variation by using a pitch rate obtained by a three-axis gyroscopic sensor or the like. The expression (11) is obtained by taking the constraint conditions 1 to 3 into the expression (13). Then the expression (12) is obtained by replacing a value $V_{wheel}$ detected by a tire wheel velocity sensor in the expression (11) with the sum of an initial velocity value $V^0$ and an acceleration integrated value $\Delta V_G$.

In the expression (12), the satellite direction velocity $Vs^t_i$ is a satellite direction velocity in the GPS satellite i direction at time t and is calculated by the satellite direction velocity calculation unit 116. $\Delta V^t_G$ is an acceleration integrated value at time t and is calculated by the integration processing unit 104. $(Gx^t_i, Gy^t_i, Gz^t_i)$ is a line-of-sight vector at time t and is calculated by the line-of-sight vector calculation unit 113. $\theta^t_{gyro}$ is a yaw rate integrated value and calculated by the integration processing unit 104. The unknown parameters in the expression (12) therefore are four of $\theta^0$, $Cbv^0$, A, and $V^0$.

When four expressions can be formed therefore, an initial velocity value $V^0$ and an orientation initial value $\theta^0$, those being unknown parameters, can be obtained. Moreover, the unknown parameters $\theta^0$, $Cbv^0$, A, and $V^0$ are constant with time as long as the time is on and after initial time. As a result, four expressions are not required to be formed at the same time and the unknown parameters can be obtained as long as the number of the expressions formed at more than one time is four or more in total. For example, even when the number of observation satellites at each of four times ($t_0$, $t_1$, $t_2$, and $t_3$) is one, an initial velocity value $V^0$ and an orientation initial value $\theta^0$ can be obtained by using data from the observed GPS satellites.

The estimated velocity determination unit 128 sequentially calculates an estimated velocity $V^t_e$ in an acceleration acquisition cycle by adding an acceleration integrated value $\Delta V^t_G$ calculated by the integration processing unit 104 to an initial velocity value $V^0$ determined by the initial setting value determination unit 126.

In contrast, when the velocity vector calculation unit 118 calculates a velocity vector and when the stop determination unit 122 determines that a vehicle stops, an estimated velocity $V^t_e$ is not calculated. The reason why an estimated velocity $V^t_e$ is not calculated when the velocity vector calculation unit 118 calculates a velocity vector is that a velocity vector calculated by the velocity vector calculation unit 118 has a better accuracy. The reason why an estimated velocity $V^t_e$ is not calculated when the stop determination unit 122 determines that a vehicle stops is that the velocity at the time is 0 km/h without requiring calculation.

The estimated orientation determination unit 130 calculates an estimated orientation $\theta^t_e$ sequentially in a relative azimuth determination cycle by adding a relative azimuth $\theta^t_{gyro}$ calculated by the integration processing unit 104 to an orientation initial value $\theta^0$ determined by the initial setting value determination unit 126.

A velocity vector estimation unit 132 obtains a velocity vector (Vx, Vy, Vz) of a vehicle from an estimated velocity $V^t_e$ determined by the estimated velocity determination unit 128 and an estimated orientation $\theta^t_e$ determined by the estimated orientation determination unit 130. Since a velocity toward an estimated orientation $\theta^t_e$ is an estimated velocity $V^t_e$, a velocity vector (Vx, Vy, Vz) can be obtained by dividing an estimated velocity into the x, y, and z components. A velocity vector (Vx, Vy, Vz) estimated by the velocity vector estimation unit 132 is used for estimating the position of a vehicle in a time period from when a current position of the vehicle is determined by using a GPS signal to when another current position of the vehicle is determined by using the next GPS signal, for example.

Here, when the stop determination unit 122 determines that a vehicle stops, the velocity vector estimation unit 132 sets the velocity vector (Vx, Vy, Vz) at (0, 0, 0).

<Flow of Processing by Control Unit 100>

Figure 3:
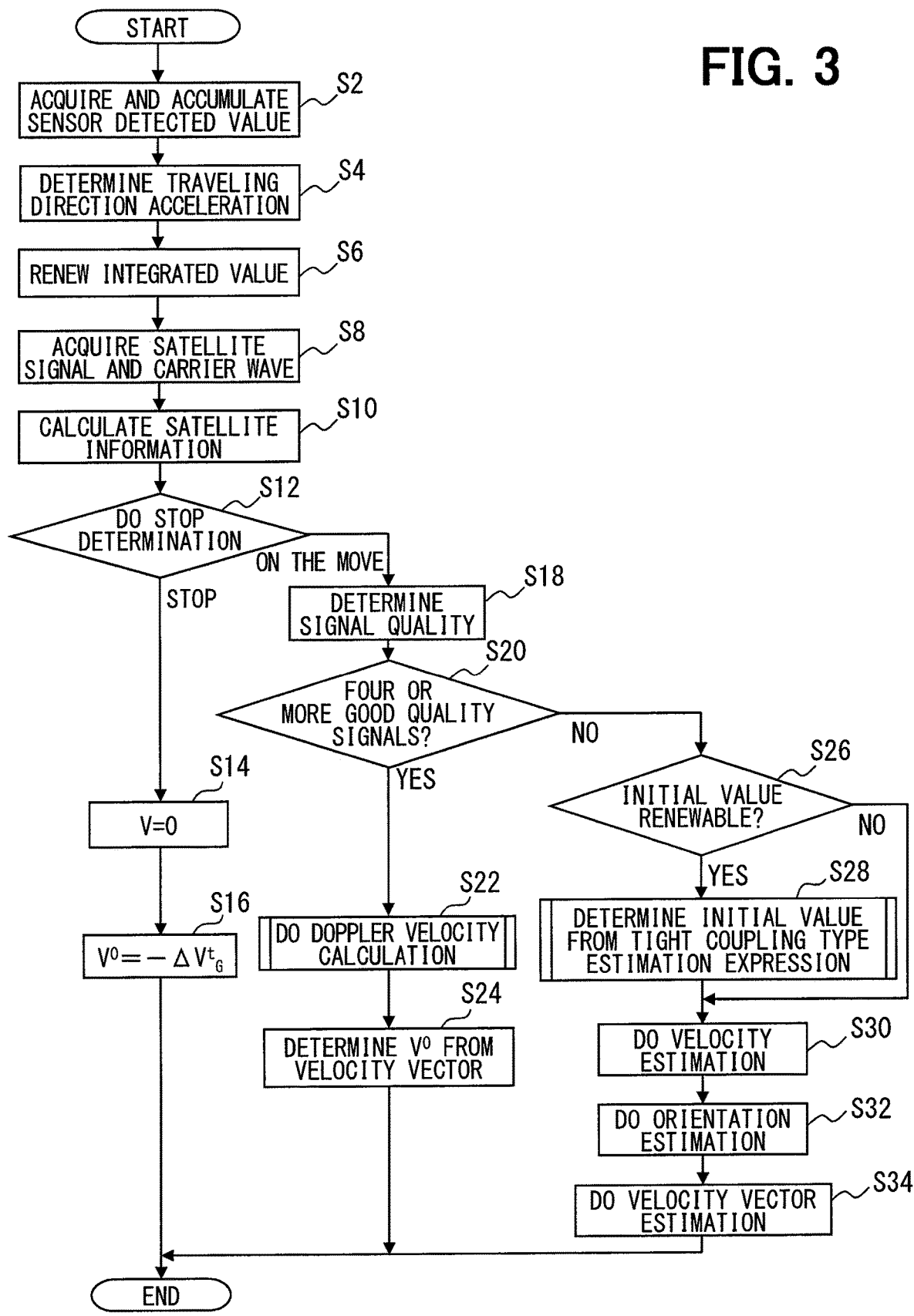
FIG. 3 is a flowchart showing a flow of processing carried out by a control unit in FIG. 1.
Figure 4:
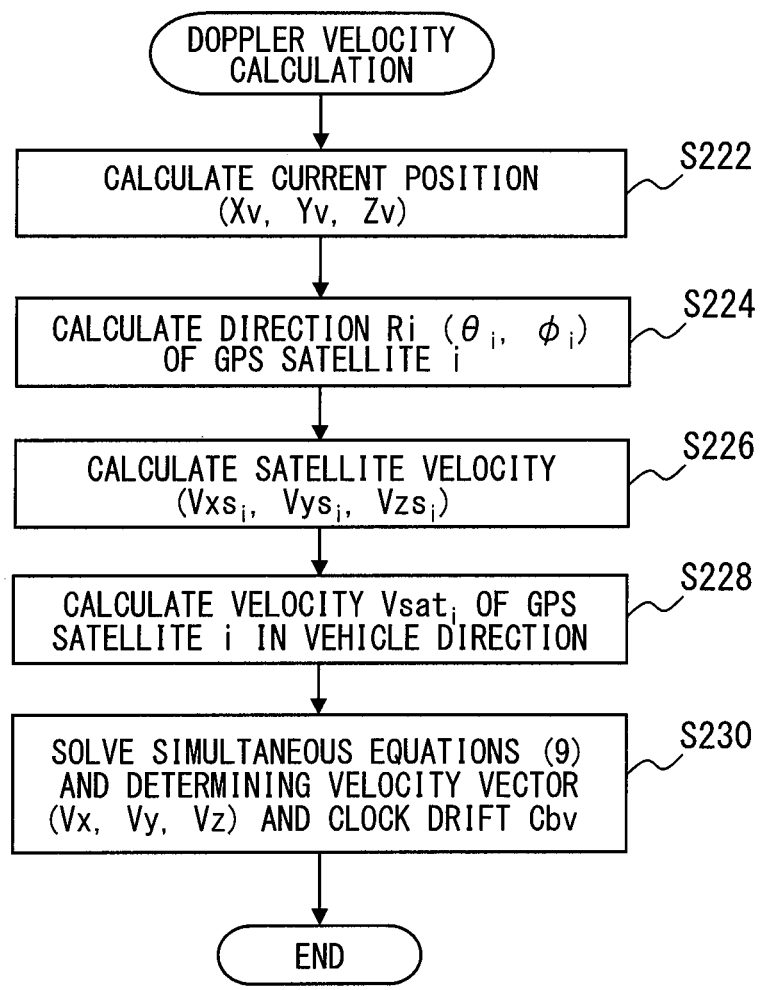
FIG. 4 is a flowchart showing details of Step S22 in FIG. 3.
Figure 5:
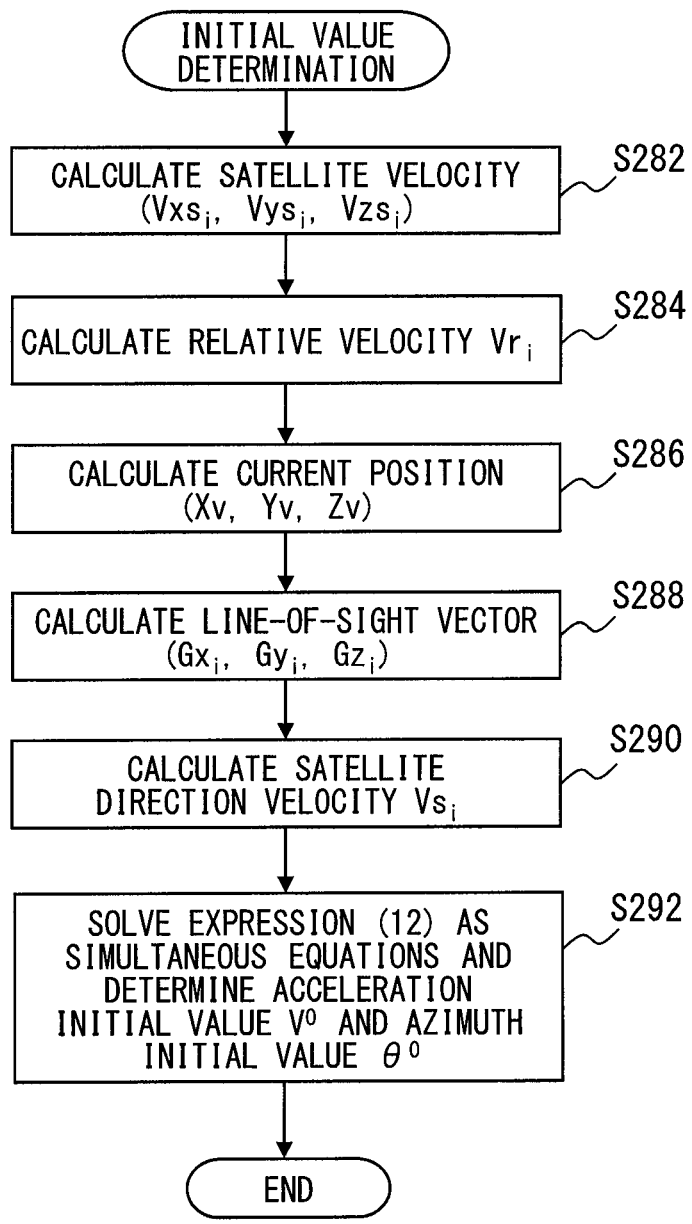
FIG. 5 is a flowchart showing details of Step S28 in FIG. 3.

An example of flow of processing by a control unit 100 is hereunder explained in reference to the flowcharts in FIGS. 3 to 5. The processing of the flowchart shown in FIG. 3 is carried out repeatedly in a cycle of acquiring a value of a sensor. Here, each of the parameters means a value at a time period t unless otherwise specified.

In FIG. 3, values detected by the acceleration sensor 20 and the yaw rate sensor 30 are obtained and stored in a memory unit such as a RAM at Step S2. The processing is carried out by the integration processing unit 104 for example.

Step S4 is the processing carried out by the traveling direction acceleration determination unit 102 and a traveling direction acceleration is determined from a detected value of the acceleration sensor 20 acquired at Step S2.

Step S6 is the processing carried out by the integration processing unit 104 and a relative azimuth $\theta^t_{gyro}$ is renewed by adding a detected value of the yaw rate sensor 30 acquired at Step S2 to the last relative azimuth $\theta^{t-1}_{gyro}$. Further, an acceleration integrated value $\Delta V^t_G$ is renewed by adding a traveling direction acceleration determined at Step S2 to the last acceleration integrated value $\Delta V^{t-1}_G$.

Steps S8 and S10 are the processing carried out by the satellite information acquisition unit 106. At Step S8, a GPS signal and a carrier wave are acquired from the GPS signal reception unit 10. At Step S10, a positional coordinate ($X_{si}$, $Y_{si}$, $Z_{si}$), a pseudo range $\rho_i$, and a Doppler shift amount $D_i$ of a GPS satellite i are calculated from the GPS signal and the carrier wave acquired at Step S8.

Step S12 is the processing by the stop determination unit 122 and whether or not a vehicle stops is determined from a detected z axis value of the acceleration sensor 20 obtained at Step S2, for example. The processing advances to Step S14 when the vehicle is determined to stop and to Step S18 when the vehicle is determined to be moving.

Step S14 is the processing by the velocity vector estimation unit 132 and a velocity vector is set at (0, 0, 0). Needless to say, a velocity is also 0.

Step S16 is the processing by the initial setting value determination unit 126 and an initial velocity value $V^0$ is set at the latest acceleration integrated value $-\Delta V^t_G$.

Step S18 that is carried out when a vehicle is determined to be moving at Step S12 is the processing by the signal quality determination unit 120 and whether or not the signal quality of a GPS signal is good is determined on the basis of the aforementioned determination condition. The determination of the signal quality is applied to all of the acquired GPS signals.

Step S20 is the processing by the velocity vector calculation unit 118 and whether or not the number of GPS signals the signal qualities of which are determined to be good at Step S18 is four or more is determined. When the number is four or more, the processing advances to Step S22.

At Step S22, a Doppler velocity is calculated. The Doppler velocity means a velocity vector (Vx, Vy, Vz) calculated by the velocity vector calculation unit 118 or the magnitude of the velocity vector. The velocity vector (Vx, Vy, Vz) is calculated by using a Doppler shift amount D and hence is called a Doppler velocity here.

The detailed processing at Step S22 is shown in FIG. 4. In FIG. 4, Step S222 is the processing by the current position calculation unit 112 and a current position ($X_v$, $Y_v$, $Z_v$) of a vehicle is calculated from a pseudo range $\rho_i$ and a positional coordinate ($X_{si}$, $Y_{si}$, $Z_{si}$) of a GPS satellite i calculated at Step S10.

Step S224 is the processing carried out by the satellite direction calculation unit 114 and a direction $R_i$ ($\theta_i$, $\phi_i$) of a GPS satellite i is calculated from a current position ($X_v$, $Y_v$, $Z_v$) of a vehicle calculated at Step S222 and a positional coordinate ($X_{si}$, $Y_{si}$, $Z_{si}$) of the GPS satellite calculated at Step S10.

Step S226 is the processing carried out by the satellite velocity calculation unit 110 and a velocity vector ($Vxs_i$, $Vys_i$, $Vzs_i$) of a GPS satellite i is calculated from the time-series data of a positional coordinate ($X_{si}$, $Y_{si}$, $Z_{si}$) of the GPS satellite i calculated at Step S10.

Steps S228 and S230 are the processing by the velocity vector calculation unit 118. At Step S228, a velocity $Vsat_i$ of a GPS satellite i in the vehicle direction is calculated from a direction $R_i$ of the GPS satellite i calculated at Step S224 and a velocity vector ($Vxs_i$, $Vys_i$, $Vzs_i$) of the GPS satellite i calculated at Step S226 by $Vsat_i = R_i [Vxs_i, Vys_i, Vzs_i]^T$.

At Step S230, four or more simultaneous equations shown by the expression (9) are formed and the simultaneous equations are solved. As a result, a velocity vector ($Vx^t$, $Vy^t$, $Vz^t$) of a vehicle and a clock drift $Cbv^t$ can be obtained.

Let's return to the explanation based on FIG. 3. Step S24 is the processing by the initial setting value determination unit 126 and an initial velocity value $V^0$ is determined from a velocity vector ($Vx^t$, $Vy^t$, $Vz^t$) of a vehicle calculated at Step S22 by the expression (10).

When the number of the signals having good qualities is determined to be three or less at Step S20, the processing advances to Step S26. The Step S26 is the processing by the initial setting value determination unit 126 and whether or not an initial value can be renewed is determined. The determination means concretely that whether or not four or more expressions (12) can be formed by using satellite signals after an initial velocity value $V^0$ is renewed is determined. If the determination is No, the processing advances to Step S30 and, if the determination is Yes, the processing advances to Step S28.

At Step S28, an initial velocity value $V^0$ and an orientation initial value $\theta^0$ are determined by using a tight coupling type estimation expression. The tight coupling type estimation expression is concretely the expression (12).

The detailed processing at Step S28 is shown in FIG. 5. In FIG. 5, Step S282 is the processing carried out by the satellite velocity calculation unit 110 and a velocity vector $(Vxs_i, Vys_i, Vzs_i)$ of a GPS satellite i is calculated from the time-series data of a positional coordinate $(X_{si}, Y_{si}, Z_{si})$ of the GPS satellite i calculated at Step S10.

Step S284 is the processing carried out by the relative velocity calculation unit 108 and a relative velocity $Vr_i$ of a vehicle to a GPS satellite i is calculated by substituting a Doppler shift amount $D_i$ calculated at Step S10 into the aforementioned expression (2).

Step S286 is the processing by the current position calculation unit 112 and a current position $(X_v, Y_v, Z_v)$ of a vehicle is calculated from a pseudo range $\rho_i$ and a positional coordinate $(X_{si}, Y_{si}, Z_{si})$ of a GPS satellite i calculated at Step S10.

Step S288 is the processing carried out by the line-of-sight vector calculation unit 113. At Step 288, a line-of-sight vector $(Gx_i, Gy_i, Gz_i)$ is calculated by substituting a pseudo range $\rho_i$ and a positional coordinate $(X_{si}, Y_{si}, Z_{si})$ of a GPS satellite i calculated at Step S10 and a current position $(X_v, Y_v, Z_v)$ of a vehicle calculated at Step S286 into the aforementioned expression (6).

Step S290 is the processing carried out by the satellite direction velocity calculation unit 116. At Step S290, a satellite direction velocity $Vs_i$ of a vehicle in the direction to a GPS satellite i is calculated by substituting a relative velocity $Vr_i$ calculated at Step S284, a line-of-sight vector $(Gx_i, Gy_i, Gz_i)$ calculated at Step S288, and a velocity vector $(Vxs_i, Vys_i, Vzs_i)$ of the GPS satellite i calculated at Step S282 into the aforementioned expression (7).

Step S292 is the processing carried out by the initial setting value determination unit 126. At Step S292, four or more expressions are formed by substituting a satellite direction velocity $Vs_i$ calculated at Step S290, an acceleration integrated value $\Delta V_G$ renewed at Step S6, a relative azimuth $\theta_{gyro}$, and a line-of-sight vector $(Gx_i, Gy_i, Gz_i)$ calculated at Step S288 into the aforementioned expression (12). Then the simultaneous equations comprising the four or more expressions are solved. As a result, an initial velocity value $V^0$ and an orientation initial value $\theta^0$ which are the unknown parameters in the expression (12) can be obtained simultaneously.

Let's return to the explanation based on FIG. 3. When Step S28 is carried out or when the determination at Step S26 is No, Step S30 is carried out. Step S30 is the processing carried out by the estimated velocity determination unit 128 and an estimated velocity $V_e$ is calculated from the latest initial velocity value $V^0$ and an acceleration integrated value $\Delta V_G$ renewed at Step S6.

As shown in FIG. 3, when an initial velocity value $V^0$ is renewed but an acceleration integrated value $\Delta V_G$ is not reset, an estimated velocity $V_e$ is calculated by adding the initial velocity value $V^0$ to the acceleration integrated value $\Delta V_G$. When an initial velocity value $V^0$ is renewed and an acceleration integrated value $\Delta V_G$ is reset, an estimated velocity $V_e$ is calculated by adding the acceleration integrated value $\Delta V_G$ to the initial velocity value $V^0$.

Step S32 is the processing carried out by the estimated orientation determination unit 130 and an estimated orientation $\theta_e$ is calculated from the latest orientation initial value $\theta^0$ and a relative azimuth $\theta_{gyro}$ renewed at Step S6. The concrete calculation method of an estimated orientation $\theta_e$ is the same as the case of replacing an initial velocity value $V^0$ with an orientation initial value $\theta^0$ and replacing an acceleration integrated value $\Delta V_G$ with a relative azimuth $\theta_{gyro}$ in a method of calculating an estimated velocity $V_e$ from the initial velocity value $V^0$ and the acceleration integrated value $\Delta V_G$.

Step S34 is the processing carried out by the velocity vector estimation unit 132 and a velocity vector (Vx, Vy, Vz) of a vehicle is determined from an estimated velocity $V_e$ estimated at Step S30 and an estimated orientation $\theta_e$ estimated at Step S34. As a result, a velocity vector (Vx, Vy, Vz) can be determined even when a Doppler velocity cannot be calculated at Step S22.

Effect of Embodiment

A satellite direction velocity $Vs_i$ of a vehicle can be calculated on the basis of a line-of-sight vector (Gx, Gy, Gz) from the vehicle to a GPS satellite i, a velocity vector (Vx, Vy, Vz) of the vehicle, and a clock drift Cbv as shown in the expression (13).

In the present embodiment, in the expression (13), the x component and y component of a velocity vector are constrained by a velocity of a vehicle and the time variation of an azimuth in the traveling direction of the vehicle, namely a relative azimuth $\theta_{gyro}$ (constraint condition 1). The initial setting value determination unit 126 determines an initial velocity value $V^0$ by using the expression (12) obtained.

Since the expression (12) is constrained by the condition related to time variation in this way, simultaneous equations can comprise the expressions (12) using GPS signals at a plurality of different observation points. Unknown parameters other than an initial velocity value $V^0$ exist in the expression (12) and hence the simultaneous equations have to comprise the number of the expressions (12) corresponding to the number of the unknown parameters. In the present embodiment however, since the simultaneous equations can comprise the expressions (12) using GPS signals at a plurality of different observation points, simultaneous equations comprising the expressions (12) of the number allowing the unknown parameters to be solved can be easily formed.

The initial setting value determination unit 126 therefore can obtain an initial velocity value $V^0$ with a high frequency. Then by renewing the initial velocity value $V^0$ with a high frequency, the frequency of removing the influence of drift from a value detected by the acceleration sensor 20 increases and hence the estimation accuracy of a velocity estimated from an acceleration integrated value $\Delta V_G$ and an initial velocity value $V^0$ improves.

Further, in the present embodiment, in addition to the constraint condition 1, the expression (12) is derived by using the constraint condition 3 that the time variation of a clock drift is linear. The number of unknown parameters in the expression (12) can therefore be reduced. As a result, the simultaneous equations of the number allowing the unknown parameters to be solved can be easily formed and hence the frequency of renewing an initial velocity value $V^0$ can be increased further.

Further, the expression (12) includes an initial velocity value $V^0$ and an acceleration integrated value $\Delta V_G$ as the term of a velocity of a vehicle. By solving the simultaneous equations comprising the expressions (12) of the number corresponding to the number of the unknown parameters therefore, an initial velocity value $V^0$ can be obtained directly.

Further, in the present embodiment, the velocity vector calculation unit 118 for calculating a velocity vector (Vx, Vy, Vz) without using an acceleration integrated value $\Delta V_G$ is provided. When the velocity vector calculation unit 118 calculates a velocity vector (Vx, Vy, Vz), an initial velocity value $V^0$ is determined by using the velocity vector (Vx, Vy, Vz) calculated by the velocity vector calculation unit 118 (S24). The accuracy of a velocity vector (Vx, Vy, Vz) calculated by the velocity vector calculation unit 118 is good and hence the accuracy of an initial velocity value $V^0$ improves accordingly.

Further, in the present embodiment, when the stop determination unit 122 determines that a vehicle stops, the velocity of the vehicle is regarded as zero and an initial velocity value $V^0$ is determined (S16). The accuracy of the initial velocity value $V^0$ hereby improves. Then as a result of improving the accuracy of the initial velocity value $V^0$, the accuracy of an estimated velocity Ve calculated from the initial velocity value $V^0$ and an acceleration integrated value $\Delta V_G$ also improves.

Although the embodiment according to the present disclosure has heretofore been explained, the embodiment according to the present disclosure is not limited the embodiment described above, also includes the following modifications, and further, in addition to the following modifications, includes variously modified embodiments within the range not deviating from the tenor.

First Modification

Although a clock drift is constrained by the condition that the time variation is linear, namely the constraint condition 3, in the above embodiment, the constraint condition 3 may be omitted (first modification). When the constraint condition 3 is omitted, $Cbv^0+At$ in the expression (12) is replaced with $Cbv^t$ that is an unknown parameter.

Second Modification

Further, it is also possible to keep the constraint condition 3 and omit the constraint by the time variation of an azimuth in the constraint condition 1. On this occasion, the constraint condition 1 is the condition that the magnitude of a velocity vector is constrained only by the velocity of a vehicle and $\theta^t_{gyro}$ in the expression (12) is an unknown parameter.

Third Modification

Although a GPS is used as a satellite positioning system in the above embodiment, another satellite positioning system may also be used. Further, both a satellite included in a GPS and a satellite included in another satellite positioning system may be used.

Fourth Modification

Although a mobile object is a vehicle in the above embodiment, the technological idea of the present disclosure can be applied to a mobile object other than a vehicle.

Although examples and configurations according to the present disclosure have heretofore been exemplified, the examples and configurations according to the present disclosure are not limited to the aforementioned examples and configurations. Examples and configurations obtained by appropriately combining disclosed technology elements with different examples and configurations are also included in the range of the examples and configurations according to the present disclosure.

What is claimed is:

1. A velocity estimation device comprising:
an acceleration sensor that moves together with a mobile object to detect an acceleration of the mobile object;
a yaw rate sensor that detects a yaw rate of the mobile object; and
a computer including a processor and configured to
sequentially determine a traveling direction acceleration to determine a plurality of traveling direction accelerations, the traveling direction acceleration being a traveling direction component of a value detected by the acceleration sensor;
sequentially calculate an acceleration integrated value by integrating the plurality of traveling direction accelerations determined by the computer and sequentially calculate a relative azimuth to the traveling direction at a base point of time through integrating yaw rates detected by the yaw rate sensor;
acquire information of a satellite signal from a satellite included in a satellite positioning system;
calculate a satellite direction velocity on a basis of the information of the satellite signal, the satellite direction velocity being a component of a velocity of the mobile object in a direction to the satellite;
calculate a line-of-sight vector from the mobile object to the satellite based on the information of the satellite signal;
determine an initial velocity value of the mobile object based on (i) a velocity estimation expression showing a relationship among the satellite direction velocity, the line-of-sight vector, the velocity of the mobile object, and the relative azimuth of the mobile object, (ii) the satellite direction velocity calculated by the computer, (iii) the line-of-sight vector calculated by the computer, and (iv) the relative azimuth calculated by the computer; and
estimate the velocity of the mobile object based on the acceleration integrated value calculated by the computer and the initial velocity value determined by the computer, wherein
in an expression showing the relationship among the satellite direction velocity, the line-of-sight vector, and a velocity vector of the mobile object in the velocity estimation expression, a magnitude of the velocity vector is constrained by the velocity of the mobile object, and a time variation of a direction of the velocity vector is constrained by a time variation of the relative azimuth of the mobile object.

2. A velocity estimation device comprising:
an acceleration sensor that moves together with a mobile object to detect an acceleration of the mobile object; and
a computer including a processor and configured to
sequentially determine a traveling direction acceleration to determine a plurality of traveling direction accelerations, the traveling direction acceleration being a traveling direction component of a value detected by the acceleration sensor;

sequentially calculate an acceleration integrated value through integrating the plurality of traveling direction accelerations determined by the computer;

acquire information of a satellite signal from a satellite included in a satellite positioning system;

calculate a satellite direction velocity based on the information of the satellite signal, the satellite direction velocity being a component of a velocity of the mobile object in a direction to the satellite;

calculate a line-of-sight vector from the mobile object to the satellite based on the information of the satellite signal;

determine an azimuth of the mobile object;

determine an initial velocity value of the mobile object based on (i) a velocity estimation expression showing a relationship among the satellite direction velocity, the line-of-sight vector, the velocity of the mobile object, the azimuth of the mobile object, and a clock drift, (ii) the satellite direction velocity calculated by the computer, and (iii) the line-of-sight vector calculated by the computer; and estimate the velocity of the mobile object based on the acceleration integrated value calculated by the computer and the initial velocity value determined by the computer, wherein in an expression showing the relationship among the satellite direction velocity, the line-of-sight vector, a velocity vector of the mobile object, and the clock drift in the velocity estimation expression, a magnitude of the velocity vector is constrained by the velocity of the mobile object and the clock drift is constrained by a constraint condition that a time variation of the clock drift is linear.

* * * * *